United States Patent [19]

Leonard

[11] Patent Number: 5,155,512
[45] Date of Patent: Oct. 13, 1992

[54] CAMERA WITH HANDGRIP

[75] Inventor: Bruce A. Leonard, Honeoye Falls, N.Y.

[73] Assignee: Eastman Kodak Company, Rochester, N.Y.

[21] Appl. No.: 725,097

[22] Filed: Jul. 3, 1991

[51] Int. Cl.$^5$ .............................................. G03B 29/00
[52] U.S. Cl. ........................................................ 354/82
[58] Field of Search .................. 354/82, 288; 352/243; D16/200, 206

[56] References Cited

U.S. PATENT DOCUMENTS

| | | | |
|---|---|---|---|
| 3,508,482 | 4/1970 | Taylor | 354/82 |
| 3,988,751 | 10/1976 | Goto | 354/82 |
| 4,269,498 | 5/1981 | Suzuki et al. | 354/288 |
| 4,699,486 | 10/1987 | Konno et al. | 354/82 |
| 4,733,265 | 3/1988 | Haraguchi et al. | 354/484 |

Primary Examiner—L. T. Hix
Assistant Examiner—Howard B. Blankenship
Attorney, Agent, or Firm—Roger A. Fields

[57] ABSTRACT

In a camera having a cartridge load door on a body portion and a battery load door on a battery containing handgrip, each of the doors and the handgrip are supported for pivoting individually only about a single common axis. Pivoting the handgrip from a folded position to an extended position pivots the battery load door flush aginst the cartridge load door. The battery load door is opened by pivoting it flush against the cartridge load door when the handgrip is in the folded position. The cartridge load door is opened by pivoting it flush against the battery load door when the handgrip is in the folded position. This arrangement provides a compact, simple design.

11 Claims, 3 Drawing Sheets

CAMERA WITH HANDGRIP

BACKGROUND OF THE INVENTION

1. Field of the Invention

The invention relates generally to the field of photography and in particular to a camera with a built-in handgrip.

2. Description of the Prior Art

It is well known to design a camera, such as a 35 mm type, wherein a cartridge load door is closed to cover an entrance to a cartridge receiving chamber and is opened to uncover the entrance to that chamber, a battery load door is closed to cover an entrance to a battery receiving chamber and is opened to uncover the entrance to that chamber, and a handgrip is provided to hold the camera steady during picture-taking. Compactness and simplicity of design have continued to require improvement.

SUMMARY OF THE INVENTION

In a camera having a cartridge load door on a body portion and a battery load door on a battery containing handgrip, each of the doors and the handgrip are supported for Pivoting individually only about a single common axis. Pivoting the handgrip from a folded position to an extended position pivots the battery load door flush against the cartridge load door. The battery load door is opened by pivoting it flush against the cartridge load door when the handgrip is in the folded position. The cartridge load door is opened by pivoting it flush against the battery load door when the handgrip is in the folded position. This arrangement provides a compact, simple design as compared to prior art devices.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
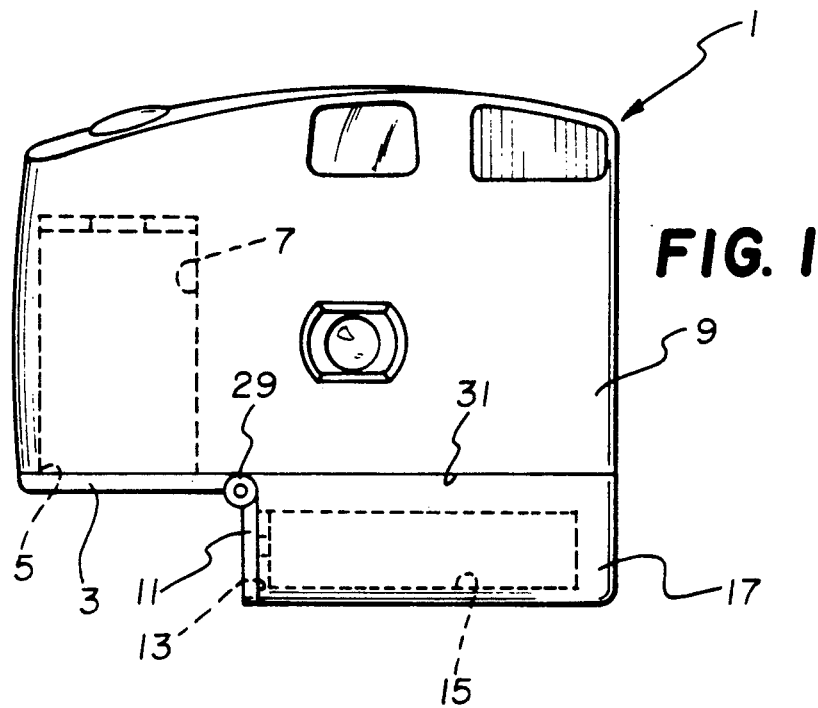
FIG. 1 is a front elevation view of a camera according to a preferred embodiment of the invention, shown with a handgrip in a folded position.
Figure 2:
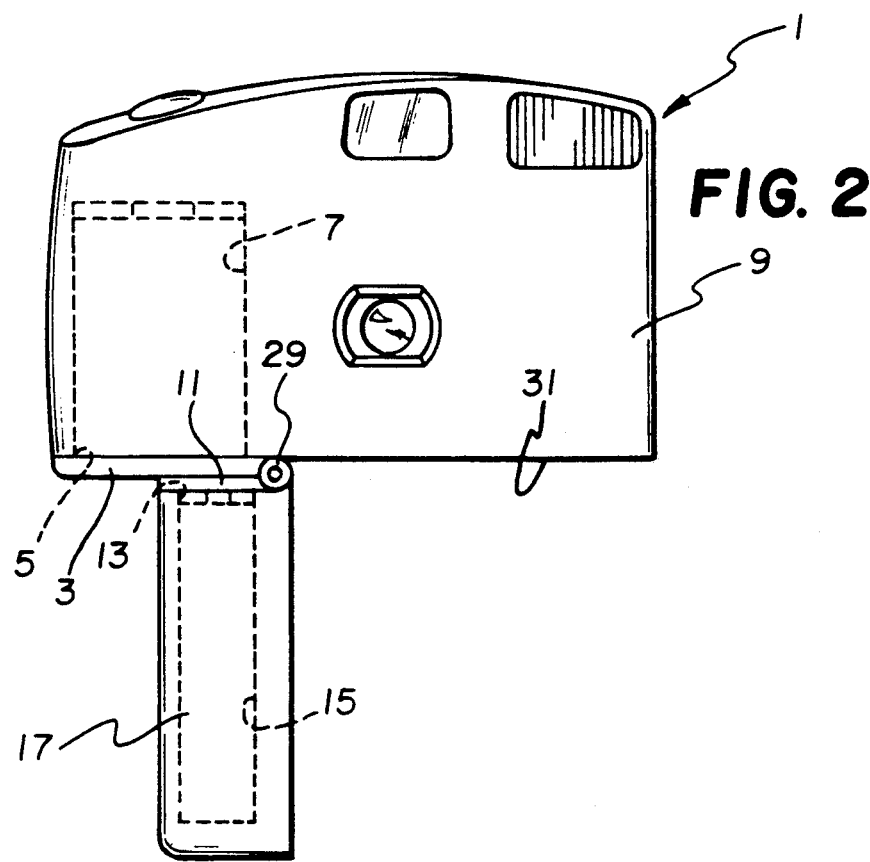
FIG. 2 is a front elevation view of the camera, shown with the handgrip in an extended position.
Figure 3:
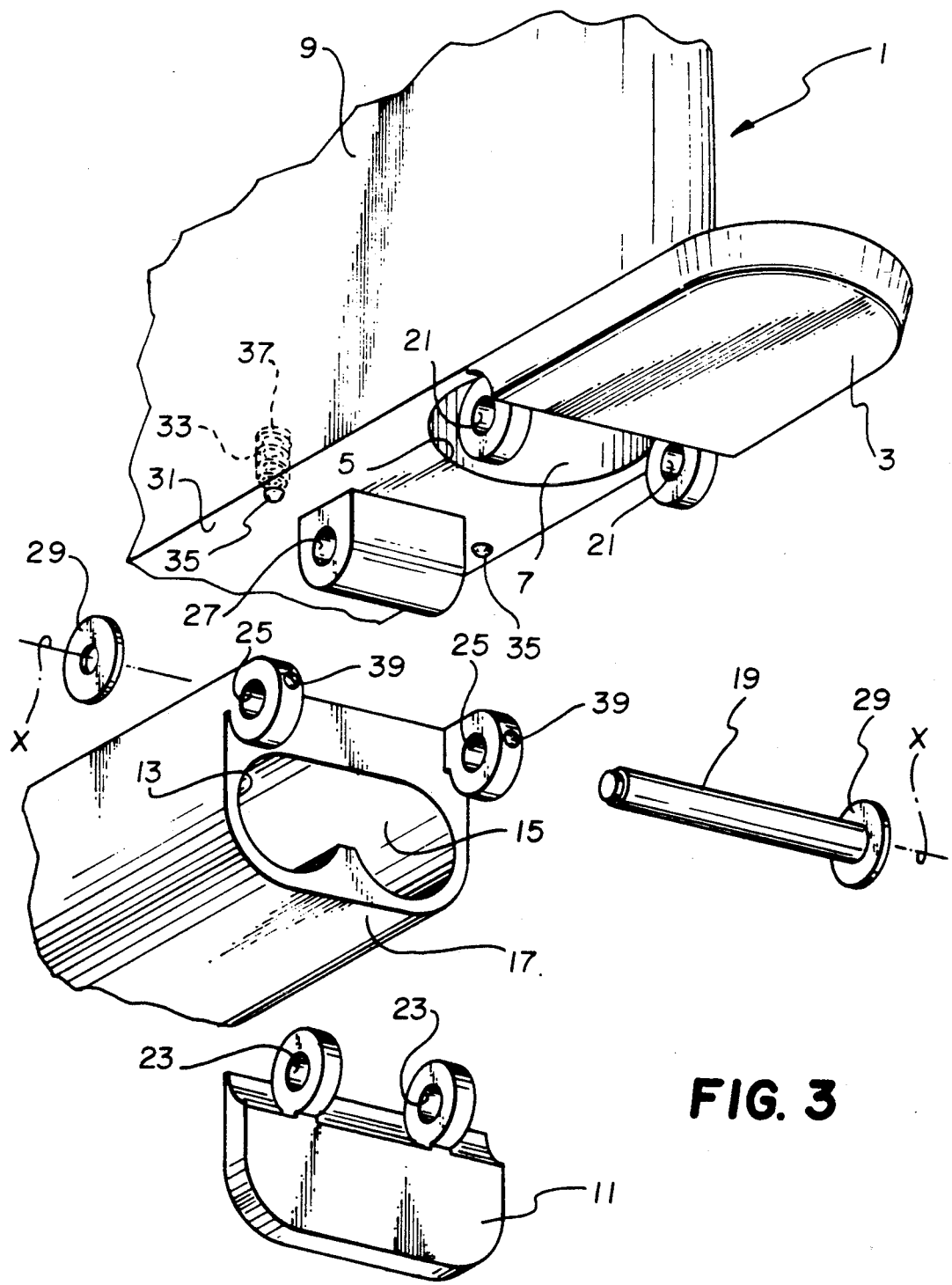
FIG. 3 is an exploded perspective view of the handgrip, a cartridge load door on a body portion of the camera and a battery load door on the handgrip.

Referring now to the drawings, FIGS. 1-3 show a photographic camera 1 wherein a cartridge load door 3 is closed to cover an entrance (opening) to a cartridge receiving chamber 7 in a body portion 9 of the camera, and a battery load door 11 is closed to cover an entrance (opening) 13 to a battery receiving chamber 15 in a handgrip 17. Known means, not shown, are provided to releasably lock the cartridge load door 3 and the battery load door 11 closed. Alternatively, relatively light springs, not shown, may be used to bias the two doors 3 and 11 closed.

Figure 4:
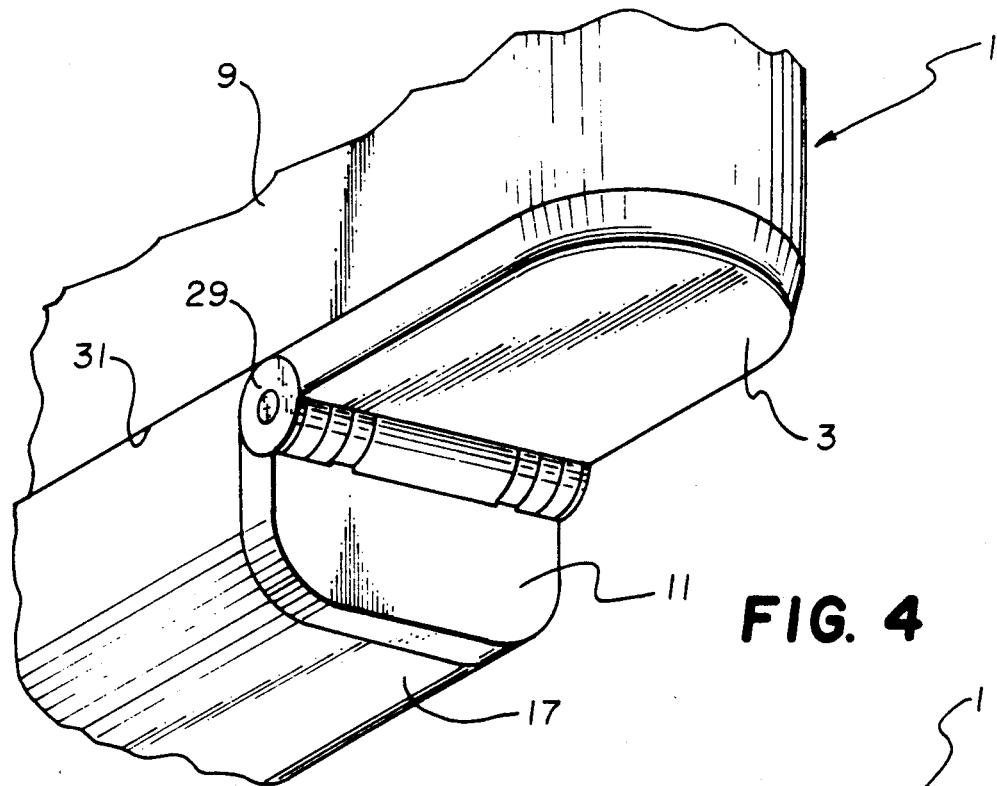
FIG. 4 is a perspective view showing details of the doors and the handgrip when the handgrip is in its folded position.
Figure 5:
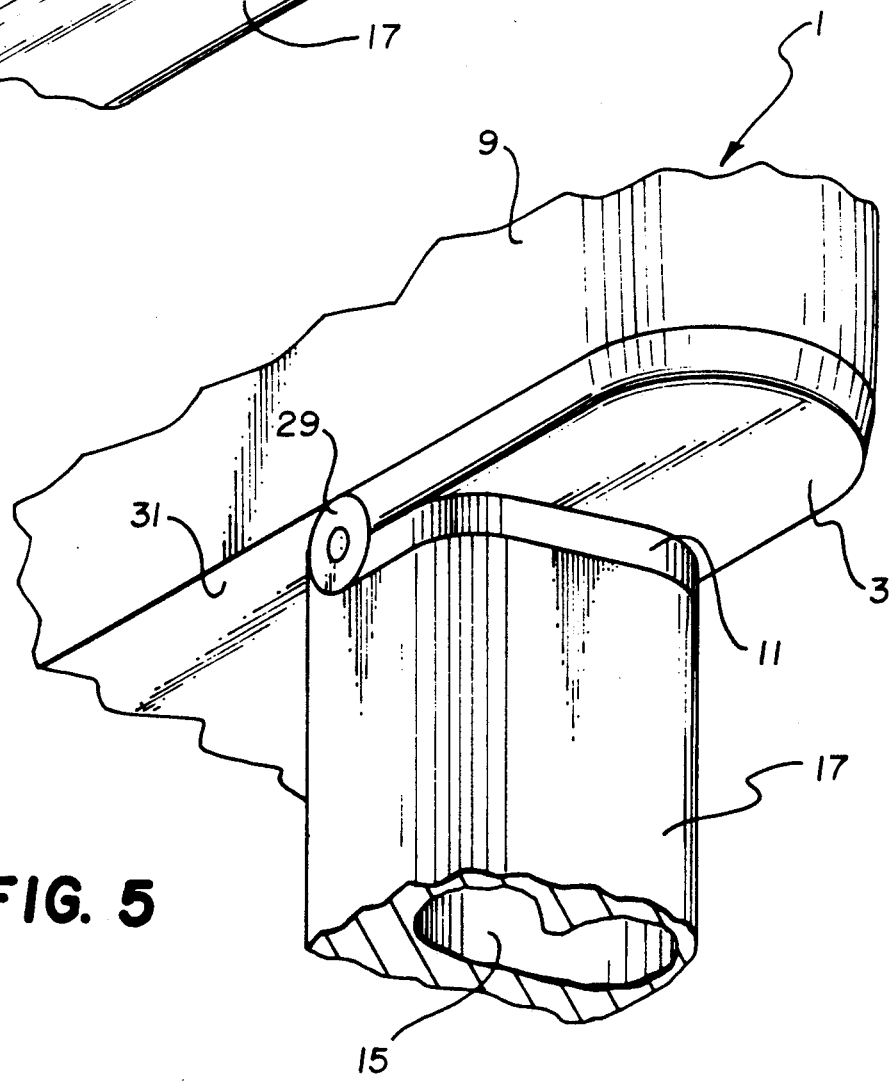
FIG. 5 is a perspective view similar to FIG. 4 when the handgrip is in its extended position.

As shown in FIG. 3, a pin 19 extends through a pair of lug openings 21 in the cartridge load door 3, through a pair of spaced lug openings 23 in the battery load door 11, through a pair of spaced lug openings 25 in the handgrip 17, and through a single lug opening 27 in the body portion 9. A pair of end caps 29 are affixed to opposite ends of the pin 19 to retain the pin in the respective lug openings 21, 23, 25 and 27. This arrangement supports the cartridge load door 3 for pivoting in a counter-clockwise direction in FIG. 1, about an axis X coextensive with the pin 19, to flush against the battery load door 11 to open the cartridge load door. Also, it supports the battery load door 11 for pivoting in a clockwise direction in FIG. 1, about the axis X, to flush against the cartridge load door 3 to open the battery load door. Also, it supports the handgrip 17 for pivoting with the battery load door 11, about the axis X between a folded position flush against a bottom face 31 of the body portion 9 as shown in FIGS. 1 and 4 and an extended position substantially perpendicular to the bottom face 31 as shown in FIGS. 2 and 5. Two pairs of a spring 33 and a ball bearing 35, (only one pair shown) are located in respective wells 37 in the body portion 9 to be received in corresponding cavities 39 in the handgrip 17, when the handgrip is in the folded position, to releasably retain the handgrip in that position. See FIG. 3. Known means, not shown, are provided to releasably secure the handgrip 17 in the extended position.

The invention has been described with reference to a preferred embodiment. However, it will be appreciated that variations and modifications can be effected within the ordinary skill in the art without departing from the scope of the invention.

We claim:

1. An improved camera wherein a cartridge load door is closed to cover an entrance to a cartridge receiving chamber and is opened to uncover the entrance to that chamber, and a battery load door is closed to cover an entrance to a battery receiving chamber and is opened to uncover the entrance to that chamber, and wherein the improvement comprises:

support means supporting said cartridge load door and said battery load door for pivoting individually only about a single common axis to open and close the two doors.

2. An improvement as recited in claim 1, wherein said support means includes integral means supporting said cartridge load door for pivoting flush against said battery load door to open the cartridge load door.

3. An improvement as recited in claim 1 or 2, wherein said support means includes integral means for supporting said battery load door for pivoting flush against said cartridge load door to open the battery load door.

4. An improvement as recited in claim 1, further comprising:

a handgrip which contains said battery load chamber; and wherein said support means includes integral means supporting said handgrip for pivoting with said battery load door between a folded position and an extended position.

5. An improvement as recited in claim 4, wherein said support means includes integral means supporting said battery load door for pivoting flush against said cartridge load door responsive to pivoting said handgrip from its folded position to its use position.

6. An improvement as recited in claim 5, wherein said support means includes integral means supporting said battery load door for pivoting flush against said cartridge load door to open the battery load door only when said handgrip is in its folded position.

7. An improvement as recited in claim 5 or 6, wherein said support means includes integral means supporting said cartridge load door for pivoting flush against said battery load door to open the cartridge load door only when said handgrip is in its folded position.

8. An improvement as recited in claim 5 or 6, wherein said support means includes integral means supporting said handgrip flush against a body portion of said camera when the handgrip is in its folded position and supporting the handgrip substantially perpendicular to said body portion when the handgrip is in its extended position.

9. An improvement as recited in claim 7, wherein said support means includes integral means supporting said handgrip flush against a body portion of said camera when the handgrip is in its folded position and supporting the handgrip substantially perpendicular to said body portion when the handgrip is in its extended position.

10. An improved camera wherein a cartridge load door is closed to cover an entrance to a cartridge receiving chamber and is opened to uncover the entrance to that chamber, and a battery load door is closed to cover an entrance to a battery receiving chamber and is opened to uncover the entrance to that chamber, and wherein the improvement comprises:

support means supporting said cartridge load door for pivoting flush against said battery load door to open the cartridge load door and supporting the battery load door for pivoting flush against the cartridge load door to open the battery load door.

11. An improvement as recited in claim 10, further comprising:

a handgrip which contains said battery load chamber; and wherein said support means includes integral means supporting said handgrip for pivoting with said battery load door between a folded position and an extended position.

* * * * *